United States Patent [19]

Drewery

[11] 4,223,341
[45] Sep. 16, 1980

[54] CIRCUITRY PROVIDING A DELAYED COLOR TELEVISION SIGNAL HAVING LUMINANCE AND CHROMINANCE COMPONENTS DERIVED FROM ADJACENT LINES

[75] Inventor: John O. Drewery, Coulsdon, England

[73] Assignee: British Broadcasting Corporation of Broadcasting House, London, England

[21] Appl. No.: 30,239

[22] Filed: Apr. 16, 1979

Related U.S. Application Data

[63] Continuation-in-part of Ser. No. 897,282, Apr. 17, 1978, abandoned.

[30] Foreign Application Priority Data

May 26, 1978 [GB] United Kingdom ............... 15810/78

[51] Int. Cl.$^2$ ............................................. H04N 9/535
[52] U.S. Cl. ........................................ 358/36; 358/11; 358/12
[58] Field of Search ....................... 358/31, 36, 37, 11, 358/4, 8, 1, 12, 21, 22, 167, 105, 136, 16, 40; 360/10, 11, 38

[56] References Cited

U.S. PATENT DOCUMENTS

4,058,836  11/1977  Drewery et al. ..................... 358/167

*Primary Examiner*—John C. Martin
*Attorney, Agent, or Firm*—Kemon & Estabrook

[57] ABSTRACT

In a method of and apparatus for processing 625-line PAL colour television signals, in which in conjunction with each line of the signal there is provided an additional signal for use therewith, the additional signal is formed essentially of the luminance component of a signal equivalent to the signal 625 lines previous to the current line, and the chrominance component of a signal substantially equivalent to the signal 624 lines previous to the current line. Alternatively, the difference of the chrominance components 624 and 626 lines previous may be used. For 525-line N.T.S.C. the luminance component is derived from the signal 525 lines previous, and the chrominance component is the chrominance component of the signal 524 or 526 lines previous to the current line, or an average of these. The form of the chrominance component may be selected automatically in dependence upon vertical chrominance detail.

32 Claims, 6 Drawing Figures

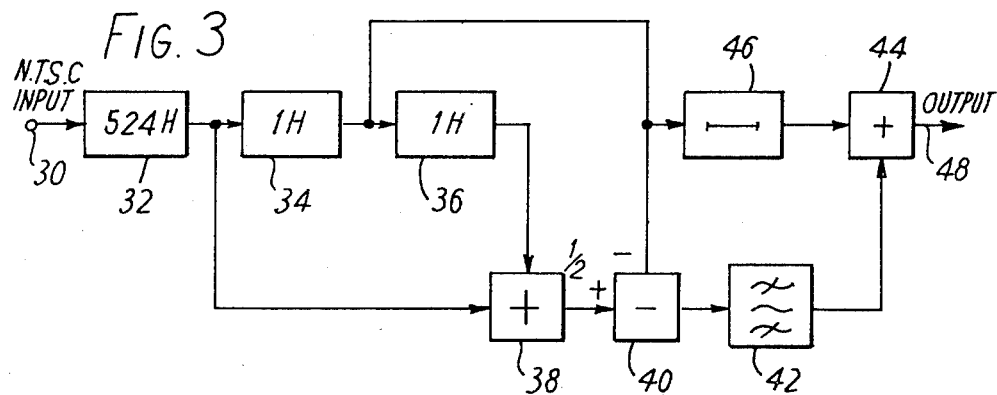
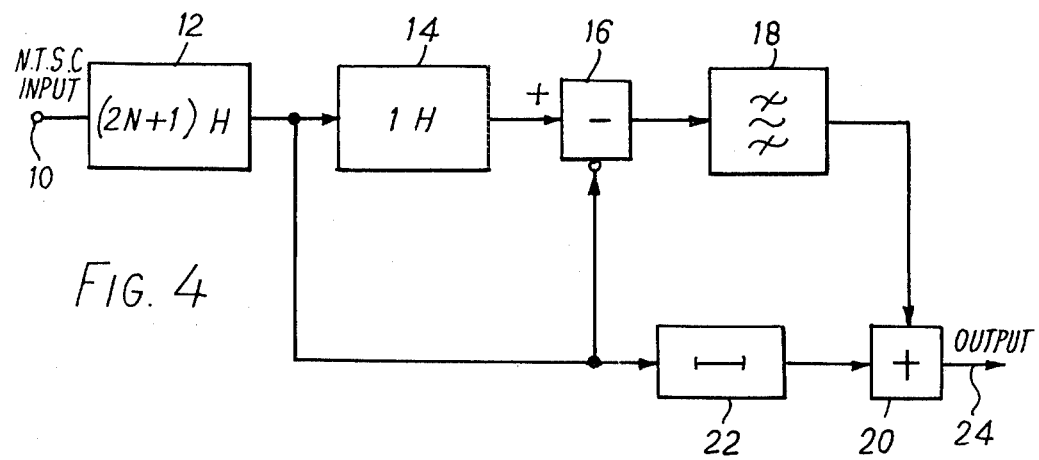

CIRCUITRY PROVIDING A DELAYED COLOR TELEVISION SIGNAL HAVING LUMINANCE AND CHROMINANCE COMPONENTS DERIVED FROM ADJACENT LINES

CROSS-REFERENCE TO RELATED APPLICATION

This application is a continuation-in-part of my application Ser. No. 897,282 filed Apr. 17, 1978, now abandoned.

BACKGROUND OF THE INVENTION

This invention concerns a method of and apparatus for processing colour television signals.

Occasions arise when processing colour television signals, e.g. of PAL or N.T.S.C. type, where it is desired to provide in conjunction with any given part of the signal, (the "current" signal), a signal derived from an earlier part of the television signal which is likely to be similar in content and is similar in form to the current signal. Such an additional or supplementary signal can be used to replace the current signal if the latter is known to contain errors, or to provide a reference for the differential coding system, or as described in U.S. Pat. No. 4,058,836 (Drewery et al) to enable a determination of the magnitude of the difference in the signals. More particularly, said earlier patent describes an arrangement for reducing the effect of noise in the signal, in which from the input signal for the current field or picture scan is subtracted the output for the preceding scan to provide a difference signal. Low amplitude portions of this signal are assumed to represent noise and are attenuated, while high amplitude portions are assumed to represent a change in picture detail and are not. The thus-modified difference signal is then added again to the output signal for the preceding scan to provide an output signal for the current scan in which the effects of noise have been subjectively reduced.

When the system is applied directly to an encoded composite colour television signal, it is necessary to ensure that the two signals used to form by subtraction the difference signal are inherently of the same form. Otherwise the difference signal will not properly represent changes in picture content but will also include components due to differences in the form of the signals.

With a view to overcoming this problem said earlier patent 4,058,836 shows in FIG. 7 of the drawings a form of a predictor which can be used to modify the signal from the preceding scan to convert it into the same form as the signal of the current scan. Such disclosure represents the closest prior art known to the Applicant. In particular, this predictor separates the luminance and chrominance components of the composite PAL signal, changes the phase of the chrominance component, and then recombines it with the luminance component.

Such a procedure is complex and liable to lead to degradation if not carried out with great accuracy.

SUMMARY OF THE INVENTION

In accordance with this invention I have appreciated that much simpler circuitry can be used. This is based on the realization that in a uniform coloured area the phase of the colour subcarrier for the current line is identical, to an accuracy of 0.0016 cycles for a 625-line PAL signal, to that in the signal for the line 624 lines earlier. So, as far as the chrominance part of the signal is concerned, the signal occurring exactly 624 line periods previously can be used as a good prediction for the current signal.

The invention accordingly provides a method of and apparatus for processing $4N \pm 1$ line PAL colour television signals, where N is an integer, in which in conjunction with each line of the signal there is provided an additional signal for use therewith, the additional signal being formed essentially of the luminance component of a signal equivalent to the signal $4N \pm 1$ lines previous to the current line, and the chrominance component of a signal substantially equivalent to the signal $4N$ lines previous to the current line.

In a preferred form of the invention the chrominance component is formed by subtracting from the signal $4N$ lines previous to the current line the signal which is $4N \pm 2$ lines previous to the current line. The signal $4N \pm 2$ lines earlier is, as regards the chrominance component, in antiphase with respect to the signal $4N$ lines earlier, so that when inverted it is in substantially the same phase as the signal $4N$ lines earlier and hence as the current signal.

In a 625-line PAL system, $4N+1$ equals 625, and the chrominance component comprises either the signal 624 lines earlier or preferably the signal 624 lines earlier minus the signal 626 lines earlier.

The above considerations also apply in an analogous manner for N.T.S.C. signals. Accordingly the invention also provides a method of and apparatus for processing a $(2N+1)$ line N.T.S.C. colour television signal, in which case the additional signal has a chrominance component substantially equivalent to the chrominance components of the signals $2N$ lines or $2N+2$ lines previous to the current line, or their average.

BRIEF DESCRIPTION OF THE DRAWINGS

The invention will now be described in more detail, by way of example, with reference to the drawings, in which:

FIG. 3 shows in block form an embodiment for processing 525-line N.T.S.C. signals;

FIG. 4 shows in block form one embodiment of the invention for processing 525 line N.T.S.C. signals;

DESCRIPTION OF THE PREFERRED EMBODIMENTS

Figure 1:
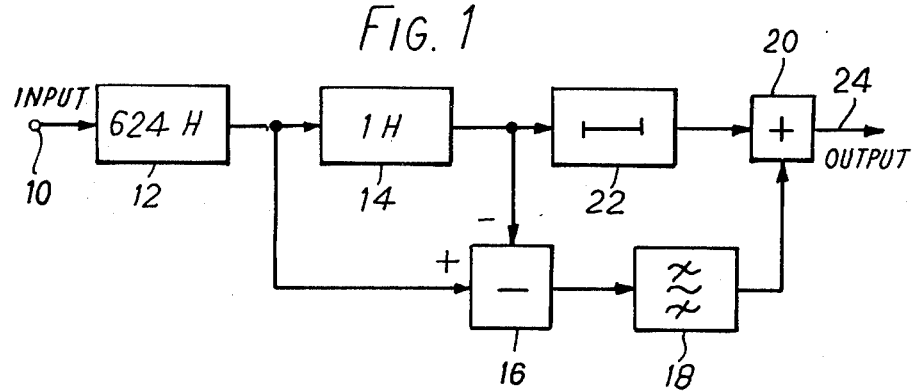
FIGS. 1 and 2 each shows in block form one embodiment of the invention for processing 625-line PAL signals.

The system of FIG. 1 has an input 10 and assumes the provision of a substantially 624-line delay 12. In the figures the letter H is used to indicate line periods of delay. This delay 12 in fact may be arranged at a separate location or as part of other signal processing apparatus, e.g. that of said earlier U.S. Pat. No. 4,058,836. The output of the delay line 12 is applied to a one-line delay 14. The output of delay i4 is subtracted from its input in a subtractor 16, the output of which is applied to a band-pass filter 18 which is centred on the colour subcarrier frequency and covers the chrominance frequency band. An adder 20 receives the output of the filter 18 and also, via a delay 22 which compensates for delays in the filter, the output of one-line delay 14. In fact, the delay 12 is less than exactly 624 lines by the delay time of delay 22. The output 24 of adder 20 constitutes the circuit output.

The input signal is delayed by substantially 624 line periods in delay 12 with respect to the current scan. The output of the delay 14 is delayed by substantially 625 line periods. For frequencies below the chrominance band the filter 18 has zero transmissions and thus the output consists of the 625-line delayed signal. For frequencies within the chrominance band the filter has unity transmission. For these frequencies the filter output consists of the 624-line delayed signal minus the 625-line delayed signal. This is added in adder 20 to the 625-line delayed signal, which thus cancels out, leaving the 624-line delayed signal.

The resultant output is thus seen to consist of a PAL signal which over the chrominance frequency band is formed of a signal equivalent to the signal 624 lines previous to the current line and over the main luminance band, i.e. the band below the chrominance band, of a signal equivalent to the signal 625 lines previous to the current line.

The circuit of FIG. 1 can fail if there is appreciable vertical chrominance or diagonal luminance detail. When used with the system of said earlier patent this is not serious, providing it is transient, because the prediction error is smoothed out by the spatial averaging of the movement detector.

More importantly, however, the spatial displacement of the high-frequency prediction causes the residual noise (after noise reduction) to move upwards at the rate of 2 picture lines per picture or 12½ secs. per picture height. This increases the visibility of the noise and is disturbing. This applies only to the noise in the chrominance band which, after demodulation, causes low-horizontal-frequency chrominance noise. The rest of the residual noise is stationary and so the degree of disturbance depends on the proportion of the video bandwidth occupied by the pass-band of the filter 18.

Figure 2:
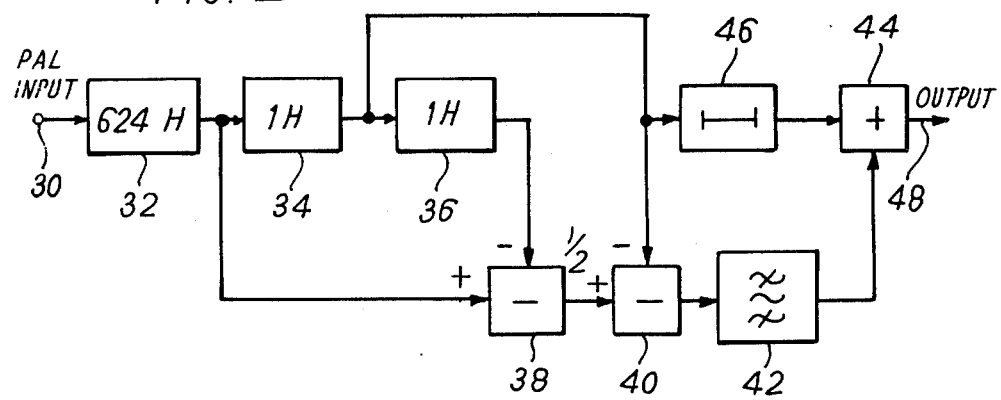

To overcome this difficulty, and that of poor prediction for vertical chrominance detail, the alternative circuit shown in FIG. 2 can be used. This has an input 30 connected to a substantially 624-line delay 32 analogous to the delay 12 of FIG. 1. The output of delay 32 is applied to two series-connected one-line delays 34 and 36 which provide respectively signals delayed by 625 and 626 lines. A halving subtractor 38 subtracts the 626-line delayed signal from delay 36 from the 624-line delayed signal from delay 32. The chrominance component of the 626-line delayed signal is 180 degrees out of phase with that of the 624-line delayed signal, and thus the chrominance component of the resultant signal will also have the phase appropriate to the current line. Thus this signal represents a chrominance prediction which is correct geometrically and in phase for the current scan.

As in FIG. 1, this signal is then applied to a subtractor 40 in which the 625-line delayed signal from delay 34 is subtracted from it, a band-pass filter 42 similar to filter 18, and an adder 44, which also receives the 625-line delayed signal via a compensating delay 46. The output 48 from the adder constitutes the circuit output. For frequencies in the chrominance band, where the transmission of filter 42 is unity, the 625-line delayed signal is subtracted and added back again. Thus the prediction consists of the output of subtractor 38. Outside the chrominance band the prediction is the 625-line delayed signal.

From the above it will be seen that the chrominance produced by subtraction of line n-626 from line n-624 has the phase appropriate to line n. Therefore no PAL modification is necessary and the chrominance corresponds both geometrically and in phase to the signal on line n. Because the chrominance prediction is taken from points equispaced above and below the current scan there is no net movement of the residual chrominance noise.

This predictor may fail when there is any line-locked luminance in the chrominance region defined by the band-pass filter for then the output of subtractor 38, being a line-to-line difference, is a bad prediction. For example, a sharp vertical edge would produce such a signal. Again, such transient behaviour would be smoothed by the circuitry of said earlier patent but line-locked high-frequency gratings would not be noise-reduced. Vertical chrominance transitions would however be noise-reduced because for those the output of subtractor 38 is a good prediction. In general, the predictor fails in those areas which normally produce extensive cross-colour. This is not thought to be serious.

Where a digital realization is used it is highly desirable that the sampling structure is line-locked, otherwise interpolation will need to be introduced.

The apparatus described may have uses other than in the system of said earlier patent, for example for temporal DPCM (differential pulse code modulation), error concealment, and "frame freezing" where the full 8-field PAL cycle must be produced from only two stored fields.

The apparatus can readily be modified to other different line standards. The 625-line PAL system is of $4N+1$ type, where N is an integer, in which the line 4N (i.e. 624) lines earlier can be used possibly in combination with the line $4N+2$ (i.e. 626) lines earlier. If a PAL signal on a line standard of $4N-1$ type is to be processed, e.g. 819 lines, then the line which is 4N (i.e. 820) lines earlier can be used possibly in combination with the line $4N-2$ (i.e. 818) lines earlier.

Furthermore the apparatus of FIG. 2 can be adapted for use with N.T.S.C. signals. This adaptation is shown in FIG. 3 which is based on FIG. 2 and in which corresponding components have the same reference numerals. For this purpose the halving subtractor 38 becomes a halving adder or averager. In the case of a 525 line N.T.S.C. signal the delay 32 is a substantially 524 line delay. With these modifications the chrominance component of the output signal consists of the average of the signals which are 524 lines and 526 lines previous to the current line. With N.T.S.C. there is no need to distinguish between line standards of $4N+1$ and $4N-1$ type as they both require the same circuitry, and thus the general case is covered by considering a line standard of $2N+1$ type.

The circuit of FIG. 1 can be used for N.T.S.C. signals, or alternatively the circuit of FIG. 4 can be used. This is based on FIG. 1 but supplies an output consisting of the luminance component of the signal 525 lines ($2N+1$ lines) earlier combined with the chrominance component of the signal 526 lines ($2N+2$ lines) earlier.

Figure 5:
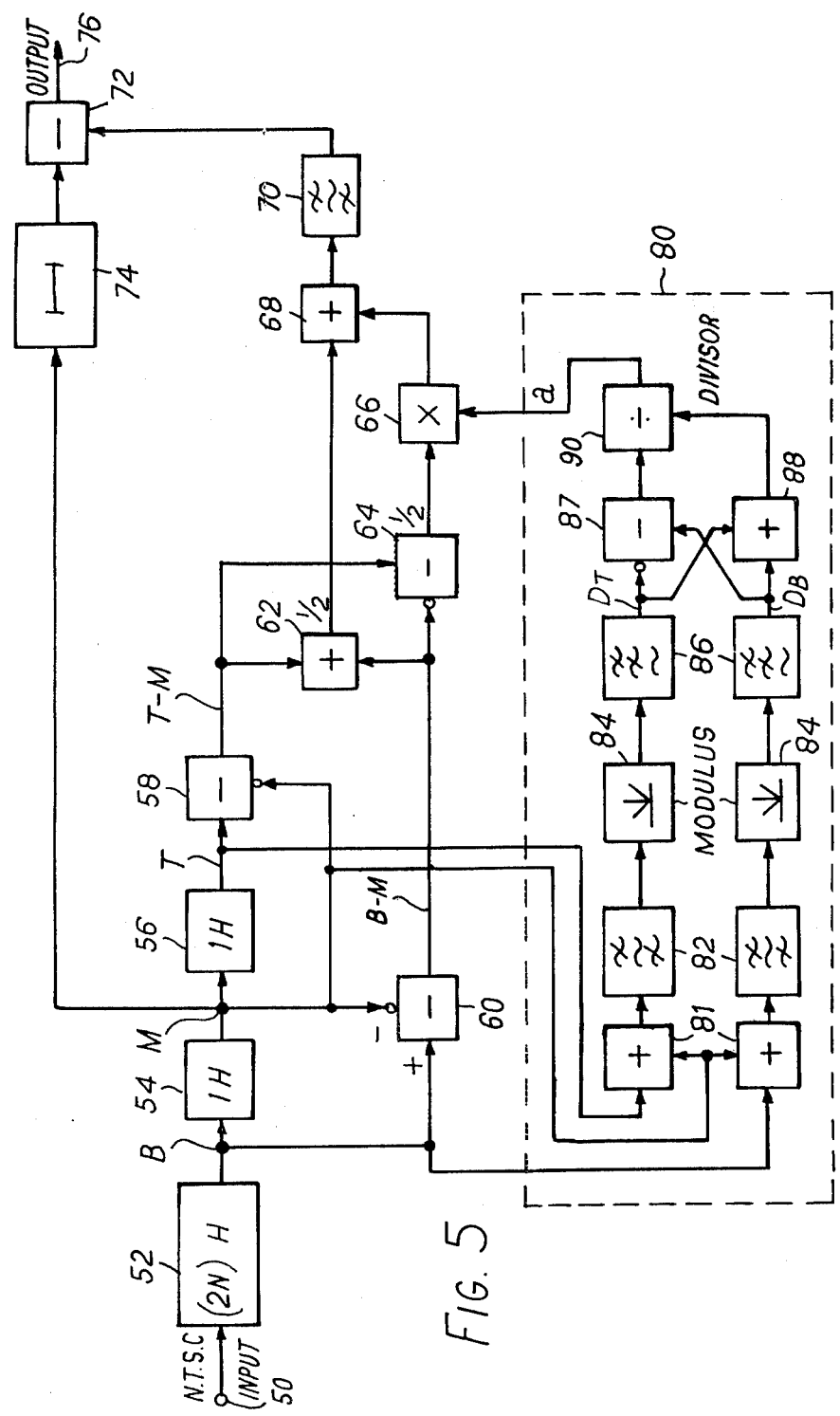
FIG. 5 shows a more complex embodiment in which the circuit is varied in accordance with signal conditions.

The circuits of FIGS. 1, 3 and 4 can all be combined as shown in FIG. 5. In this circuit, an input 50 is connected to a 2N line (e.g. 524 line) delay 52, which is in turn connected to two one-line delays 54, 56 arranged in series. The signal outputs of the three delays are denoted by B, M and T, designating the bottom, middle and top of three successive lines. Two subtractors 58, 60 provide respectively the signals T−M and B−M by subtraction across the one-line delays. A halving adder 62 adds the outputs of the two subtractors 58,60 and a halving subtractor 64 subtracts them. The output of subtractor 64 is multiplied by a factor a in a multiplier 66, and the resultant added in an adder 68 to the output of adder 62. A chrominance band-pass filter 70 receives the output of adder 68 and adds it in an adder 72 to the output M of delay 54 after the latter has passed it through an equalising delay 74. The circuit output is provided on a line 76.

By varying the value of the factor a the circuit of FIG. 5 can be made to operate as the circuit of FIGS. 1, 3 or 4. Thus if a=0, the symmetrical arrangement of FIG. 3 is obtained. If a=±1, the circuit is equivalent to FIG. 1 or FIG. 4.

The value of a is controlled by a control circuit 80 in response to the signal itself. The control circuit detects vertical chrominance detail by comparing the differences between the chrominance signal in the reference line (M) and the two neighbouring lines (B,T). For this purpose, the control circuit 80 includes two adders 81 which add the signal M from delay 54 to the signals T and B respectively, these being the output of delays 56 and 52. Chrominance bandpass filters 82 are connected to the outputs of the two adders 81 respectively, and the output of each filter 82 is rectified at 84. Low-pass filters 86 are connected respectively to the outputs of modulus circuits 84. The outputs of the low-pass filters are subtracted in a subtractor 87 and added in an adder 88, and the output of the subtractor is divided by the output of the adder in a divider circuit 90. The output of the divider constitutes the factor a.

Because in the N.T.S.C. system the subcarrier frequency is essentially equal to an odd integral multiple of half the line frequency, there is an effective subcarrier phase reversal between alternate lines. In order to subtract the chrominance components of the signal, it is therefore necessary to add the signals themselves and this is done in adders 81. The outputs of the chrominance band-pass filters 82 thus represent respectively the difference between the chrominance components of the top and middle of a set of three lines, and the difference between the bottom and middle lines. The absolute magnitudes of these differences are taken, and the low-pass filters smooth the instantaneous rectified chrominance signals to give a measure of the amplitude of the chrominance differences. These differences can be termed:

$$D_T = |C_T - C_M|$$

and $$D_B = |C_B - C_M|$$

where C is the chrominance vector composed of I and Q components.

The circuit components 87,88 and 90 then operate on the signals $D_T$ and $D_B$ to give a, in accordance with the relation:

$$a = \frac{(D_B - D_T)}{(D_B + D_T)}$$

If the reference line content is closer to the upper line, then more weight is given to the upper prediction, i.e. a>0, and vice versa if the reference line is closer to the lower line.

Figure 6:
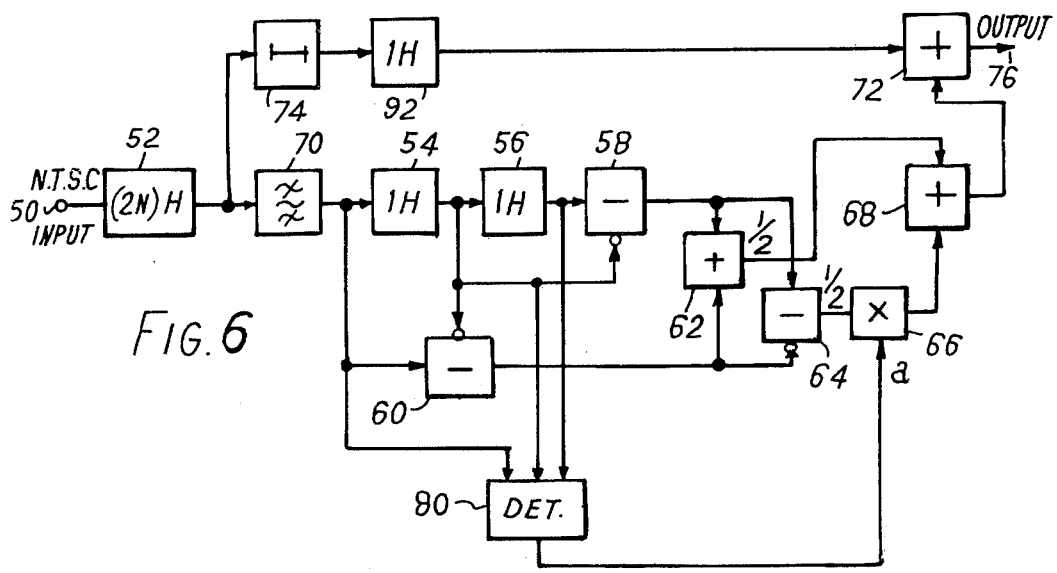
FIG. 6 shows a possible rearrangement of the circuit of FIG. 5.

As the detector 80 must operate on band-pass signals, it is more economical to rearrange the circuit as shown in FIG. 6. The detector 80 does not then need to include the chrominance bandpass filters 82, but an additional one-line delay 92 is required. This is preferable in particular for digital processing.

I claim:

1. Apparatus for processing 625-line PAL colour television signals, comprising:
   means for providing in conjunction with each line of the signal an additional signal for use therewith, said additional signal comprising the luminance component derived from the signal 625 lines previous to the current line, and the chrominance component derived from the signal 624 lines previous to the current line.

2. Apparatus as claimed in claim 1, wherein said additional signal is formed essentially only from said luminance component and said chrominance component.

3. Apparatus as claimed in claim 1, wherein said means comprises means for subtracting from the signal 624 lines previous to the current line the signal which is 626 lines previous to the current line.

4. Apparatus as claimed in claim 1, wherein said means operates digitally, and said television signal is sampled with a line-locked sampling frequency.

5. Apparatus as claimed in claim 1, wherein said means comprises:
   an input terminal;
   a substantially 624-line delay coupled to said input terminal;
   a one-line delay coupled to said 624-line delay;
   a subtractor coupled to the outputs of said two delays;
   a chrominance band-pass filter coupled to the output of said subtractor; and
   an adder coupled to the outputs of said filter and said one-line delay.

6. Apparatus as claimed in claim 1, wherein said means comprises:
   an input terminal;
   a substantially 624-line delay coupled to said input terminal;
   a first one-line delay coupled to said 624-line delay;
   a second one-line delay coupled to said first one-line delay;
   subtraction means coupled to said three delays for providing an output representative of the output of said first one-line delay subtracted from half the difference between the outputs of said 624-line delay and said second one-line delay;
   a chrominance band-pass filter coupled to the output of said subtraction means; and
   an adder coupled to the outputs of said filter and said first one-line delay.

7. A method of processing 625-line PAL colour television signals, comprising providing in conjunction with each line of the signal an additional signal for use therewith, said additional signal comprising the luminance component derived from the signal 625 lines previous to the current line, and the chrominance component derived from the signal 624 lines previous to the current line.

8. Apparatus for processing a (4N+1) line PAL colour television signal, where N is an integer, comprising:

means for providing in conjunction with each line of the signal an additional signal for use therewith, said additional signal comprising the luminance component derived from the signal 4N+1 lines previous to the current line, and the chrominance component derived from the signal 4N lines previous to the current line.

9. Apparatus as claimed in claim 8, wherein said additional signal is formed essentially only from said luminance component and said chrominance component.

10. Apparatus as claimed in claim 8, wherein said means comprises means for subtracting from the signal 4N lines previous to the current line the signal which is 4N+2 lines previous to the current line.

11. Apparatus as claimed in claim 8, wherein said means operate digitally, and said television signal is sampled with a line-locked sampling frequency.

12. Apparatus for processing a (4N−1) line PAL colour television signal, where N is an integer, comprising:

means for providing in conjunction with each line of the signal an additional signal for use therewith, said additional signal comprising the luminance component derived from the signal 4N−1 lines previous to the current line, and the chrominance component derived from the signal 4N lines previous to the current line.

13. Apparatus as claimed in claim 12, wherein said means comprises means for subtracting from the signal 4N lines previous to the current line the signal which is 4N−2 lines previous to the current line.

14. Apparatus for processing a (4N+1) line PAL colour television signal, where N is an integer, comprising circuit means for providing in conjunction with each line of the signal an additional signal for use therewith; said circuit means comprising:
  an input terminal;
  a substantially 4N-line delay coupled to said input terminal;
  a one-line delay coupled to said 4N-line delay;
  a subtractor coupled to the outputs of said two delays, a chrominance band-pass filter coupled to the output of said subtractor; and
  an adder coupled to the outputs of said filter and said one-line delay.

15. Apparatus as claimed in claim 14, wherein (4N+1) equals 625.

16. Apparatus as claimed in claim 14, wherein said circuit means operates digitally, and said television signal is sampled with a line-locked sampling frequency.

17. Apparatus for processing a (4N+1) line PAL colour television signal, where N is an integer, comprising circuit means for providing in conjunction with each line of the signal an additional signal for use therewith; said circuit means comprising:
  an input terminal;
  a substantially 4N-line delay coupled to said input terminal;
  a first one-line delay coupled to said 4N-line delay;
  a second one-line delay coupled to said first one-line delay;
  subtraction means coupled to said three delays for providing an output representative of the output of said first one-line delay subtracted from half the difference between the outputs of said 4N-line delay and said second one-line delay;
  a chrominance band-pass filter coupled to the output of said subtraction means; and
  an adder coupled to the outputs of said filter and said first one-line delay.

18. Apparatus as claimed in claim 17, wherein (4N+1) equals 625.

19. Apparatus as claimed in claim 17, wherein said circuit means operates digitally, and said television signal is sampled with a line-locked sampling frequency.

20. A method of processing a (4N+1) line PAL colour television signal, where N is an integer, comprising providing in conjunction with each line of the signal an additional signal for use therewith, said additional signal comprising the luminance component derived from the signal 4N+1 lines previous to the current line, and the chrominance component derived from the signal 4N lines previous to the current line.

21. Apparatus for processing a 2N+1 line N.T.S.C. colour television signal, where N is an integer, comprising:

means for providing in conjunction with each line of the signal an additional signal for use therewith, said additional signal comprising the luminance component derived from the signal 2N+1 lines previous to the current line, and the average of the chrominance components derived from the signals 2N lines and 2N+2 lines previous to the current line.

22. Apparatus as claimed in claim 21, wherein (2N+1) equals 525.

23. Apparatus as claimed in claim 21, wherein said means operates digitally, and said television signal is sampled with a line-locked sampling frequency.

24. Apparatus for processing a 2N+1 line N.T.S.C. colour television signal, where N is an integer, comprising:

means for providing in conjunction with each line of the signal an additional signal for use therewith, said additional signal comprising the luminance component derived from the signal 2N+1 lines previous to the current line, and the chrominance components derived from the signal 2N lines or 2N+2 lines previous to the current line.

25. Apparatus as claimed in claim 24, wherein (2N+1) equals 525.

26. Apparatus as claimed in claim 24, wherein said means operates digitally, and said television signal is sampled with a line-locked sampling frequency.

27. Apparatus as claimed in claim 24, including means for selectively varying the chrominance components between the signal 2N lines previous, the signal 2N+2 lines previous, and the average of the signals 2N lines and 2N+2 lines previous.

28. Apparatus as claimed in claim 27, wherein the varying means comprises means for detecting changes in vertical picture detail.

29. Apparatus for processing a 2N+1 line N.T.S.C. colour television signal, where N is an integer, comprising circuit means for providing in conjunction with each line of the signal an additional signal for use therewith; said circuit means comprising:
  an input terminal;
  a substantially 2N-line delay coupled to said input terminal;
  a first one-line delay coupled to said 2N-line delay;
  a second one-line delay coupled to said first one-line delay;
  combining means coupled to said three delays capable of providing an output representative of the output of said first one-line delay subtracted from the average of the outputs of said 2N-line delay and said second one-line delay;

a chrominance band-pass filter coupled to the output of said combining means; and an adder coupled to the outputs of the said filter and said first one-line delay.

30. Apparatus as claimed in claim 29, wherein (2N+1) equals 525.

31. Apparatus as claimed in claim 29, wherein said circuit means operates digitally, and the television signal is sampled with a line-locked sampling frequency.

32. A method of processing a 2N+1 line N.T.S.C. colour television signal, where N is an integer, comprising providing in conjunction with each line of the signal an additional signal for use therewith, said additional signal comprising the luminance component derived from the signal 2N+1 lines previous to the current line, and the chrominance components derived from the signal 2N lines or 2N+2 lines previous to the current line, or from a combination of these lines.

* * * * *